United States Patent [19]

Amjad et al.

[11] Patent Number: 4,532,048

[45] Date of Patent: Jul. 30, 1985

[54] METHOD FOR INHIBITING SCALE DEPOSITION

[75] Inventors: Zahid Amjad, Avon Lake; William F. Masler, III, Hinckley, both of Ohio

[73] Assignee: B. F. Goodrich Company, Akron, Ohio

[21] Appl. No.: 535,097

[22] Filed: Sep. 23, 1983

[51] Int. Cl.$^3$ .................................................. C02F 5/10
[52] U.S. Cl. ................................... 210/701; 252/180; 426/271
[58] Field of Search ............................... 210/698–701; 252/180, 181; 426/271, 580, 599

[56] References Cited

U.S. PATENT DOCUMENTS

| | | | |
|---|---|---|---|
| 2,847,308 | 8/1958 | Bersworth et al. | 426/271 |
| 3,186,849 | 6/1965 | Silverman | 426/271 |
| 3,699,048 | 10/1972 | Krueger et al. | 210/701 |
| 3,856,755 | 12/1974 | Vogt et al. | 252/181 |
| 3,879,288 | 4/1975 | Siegele | 210/701 |
| 4,029,577 | 6/1977 | Godlewski et al. | 210/701 |
| 4,389,324 | 6/1983 | Keller | 210/701 |

FOREIGN PATENT DOCUMENTS

| | | | |
|---|---|---|---|
| 2522637 | 12/1976 | Fed. Rep. of Germany | 252/180 |
| 1414964 | 11/1975 | United Kingdom | 210/699 |

*Primary Examiner*—Peter Hruskoci

[57] ABSTRACT

Copolymers which are substantially completely soluble in water at the low concentration in which they are used to treat process water, include copolymers of acrylic acid ("AA") or methacrylic acid ("MAA") and salts thereof (together referred to herein as "(meth)acrylic acid", and for brevity as "(M)AA"), and a lower alkenyl carboxylate ("LAC") such as vinyl acetate or propionate, optionally together with a salt of a lower alkenyl sulfonate ("SLAS"). Typical copolymers are those of (M)AA and vinyl acetate ("VOAc") present in a molar ratio in the range from 95:5 to about 60:40; and those of (M)AA, VOAc and sodium vinyl sulfonate ("SVS") in a molar ratio in the range from 95:4.9:0.1 to about 50:25:25. If desired, the foregoing copolymers may be hydrolyzed for use as their hydrolyzates, or the copolymers may be at least partially hydrolyzed, prior to or, during use as for example when used in alkaline boiler water systems. The compositions are useful to inhibit the deposition of particulate matter in mud suspended in the process water, and also of scale due to salts dissolved in various process water streams, particularly in boiler water and cooling water. The compositions are therefore not only excellent dispersants but also exhibit unexpected threshold and sequestering effects. They are conventionally formed and have a relatively low molecular weight, preferably in the range from about 1000 to about 25,000. The molar ratio of the reactants is such that (M)AA is always present in a molar amount which is at least 50 mole percent relative to the remaining constituent(s) of the copolymer.

18 Claims, No Drawings

METHOD FOR INHIBITING SCALE DEPOSITION

BACKGROUND OF THE INVENTION

Much effort has been expended to combat the deposition of scale, commonly referred to as "boiler scale", from water onto the inner surfaces of piping and equipment through which the water is flowed. The scale consists primarily of carbonates, phosphates, hydroxides, silicates and sulfates of the alkaline earth metals; particularly calcium and magnesium. The scale is formed due to precipitation which occurs when the ionic product exceeds the solubility product. The problem of scale deposition is intensified at higher temperatures because of the peculiar inverse temperature-solubility characteristics of these alkaline earth metal salts in water. Thus the salts precipitate more readily on the hot surfaces of heat exchangers than on cold, reducing heat transfer rates and deleteriously interfering with circulation of the water.

Until recently, for the most part, the battle to prevent or inhibit the deposition of the alkaline earth metal salts has been abandoned in favor of various mechanical and chemical treatments to remove the scale after it has been deposited. Mechanical scale removal often entails disassembly of equipment and generally subjects that equipment to the risk of mechanical damage by cutting and abrading equipment of various designs. Chemical scale removal cannot be effective without acids which are difficult to handle, and corrosive to the equipment being treated.

Currently inorganic polyphosphates are used extensively to inhibit and prevent scale and deposit formation in aqueous systems, mainly because they are effective in substoichiometric or threshold quantities, and they are relatively inexpensive. By "polyphosphates" we mean phosphates having a molar ratio of metal oxide: $P_2O_5$ in the range from about 1:1 to about 2:1. Their tendency to hydrolyze somewhat unpredictably has initiated their substitution by phosphonic acids and other polyelectrolytes which are stable in aqueous solutions.

When a precipitation inhibitor is present in a potentially scale-forming system at a markedly lower concentration than that required for sequestering the scale forming cation, it is said to be present in "threshold" amounts. See for example, Hatch and Rice, "Industrial Engineering Chemistry", Vol. 31, pg 51 at 53 (January 1939); Reitemeier and Buehrer, "Journal of Physical Chemistry", Vol. 44, No. 5, pg 535 at 536 (May 1940); Fink and Richardson U.S. Pat. No. 2,358,222; and Hatch U.S. Pat. No. 2,539,305.

Threshold inhibition generally takes place under conditions where a few (that is, 1 to about 10 ppm) of polymeric inhibitor will stabilize in solution from about 100 to several thousand ppm of scale-forming mineral. This is distinguished from sequestration because threshold inhibition occurs at substoichiometric ratios of inhibitor to scale-forming cation, whereas sequestration requires a stoichiometric ratio of sequestrant to scale-forming cation to maintain that cation in solution.

It is also known that stoichiometric and substoichiometric quantities of polymers of acrylic acid and methacrylic acid (hereinafter together referred to as "(meth)acrylic acid", and (M)AA for brevity), and (meth)acrylamide, and derivatives of the foregoing, inhibit scale formation in aqueous systems. By stoichiometric amount, we refer to an amount which is sufficient to cause complete complexing with the compound casing scale in water. Hereinafter the term "sequestering" is used to connote use of a composition in stoichiometric amounts, and "threshold" is used to connote use of substoichiometric amounts.

Such polymers are disclosed in U.S. Pat. Nos. 2,783,200; 2,980,610; 3,285,886; 3,463,730; 3,514,476; 3,518,204; 3,663,448; 3,709,815; 3,709,610; 3,880,765; 3,928,196; 4,029,577; 4,209,398; 4,324,684; and 4,326,980 inter alia, the relevant disclosures of which are included by reference as if fully set forth herein.

Polymers of (M)AA and lower alkenyl carboxylates ("LAC") such as vinyl acetate ("VOAc"); and of (M)AA and lower alkenyl alcohols ("LAOH") such as vinyl alcohol have been made with a wide range of molar ratios for use as binders for molding and core sands, paper coatings, and pigments; as, dispersing agents; and, as a warp size for textile manufacture, inter alia. Most copolymers of (M)AA and LAC are essentially insoluble in water as they contain a minor molar amount of (M)AA, that is, less than 50 moles of (M)AA in 100 moles of monomer mixture forming the copolymer, the remaining major amount being the sum of the other constituent(s) of the copolymer.

As far as we are aware, there was no reason to assume that a LAC or a LAOH might be an effective constituent of a polymer in which there is at least 50 moles of (M)AA for 100 moles of monomer mixture forming the copolymer, whether the copolymer is a bipolymer of (M)AA and LAC (or LAOH), or a terpolymer of (M)AA, LAC (or LAOH) and a lower alkenyl sulfonate such as a salt of a lower alkenyl sulfonate ("SLAS"), such as sodium vinyl sulfonate ("SVS"). The term "bipolymer" is used herein to refer specifically to a copolymer of two monomers, namely either (M)AA and LAC or (M)AA and LAOH, or mixtures of these bipolymers.

It is to be noted that U.S. Pat. No. 3,928,196 teaches a copolymer of acrylic acid and 2-acrylamido-2-methylpropanesulfonic acid which copolymer is not a terpolymer. Further, lower N-alkylacrylamido sulfonates are quite different from lower alkenyl sulfonates.

It is particularly surprising that our copolymers are effective for inhibiting scale deposition, for example, of calcium phosphate, even after the copolymers are hydrolyzed so as to form a copolymer in which one of the repeating units is an alcohol and another repeating unit is a carboxylic acid; the more so, because the effectiveness of known calcium phosphate inhibitors is greatly reduced after being subjected to hydrolytic conditions which convert the unhydrolyzed copolymer to hydrolyzed copolymer which is substantially polyacylic acid or its salts which have low activity as calcium phosphate inhibitors. Thus there was no reason to assume the products of hydrolysis of our copolymers would be effective to inhibit scale deposition.

Deposits of solid particulate matter also occur from an aqueous medium such as industrial water in which is suspended clay and metal oxides, particularly iron oxide (collectively referred to as "mud" or "sludge"). Such deposits may occur in conjunction with deposits resulting from precipitation of salts ("scale") from the water, or even when no scale is formed. To keep the mud in suspension, industrial water is treated with one or more dispersants or sludge-conditioning agents. Choosing a dispersant which is compatible with a scale inhibitor is not an easy task. It is therefore especially noteworthy that the water treatment disclosed herein is effective not only to inhibit the deposition of scale, but also to disperse mud and keep it in suspension.

SUMMARY OF THE INVENTION

It has been discovered that a copolymer of (i) acrylic acid ("AA") or methacrylic acid ("MAA"), together "(M)AA", and (ii) a lower alkenyl carboxylate ("LAC") having a weight average molecular weight (mol wt) in the range from about 1000 to about 25,000 has excellent activity in the suppression or inhibition of the formation and deposition of scale, particularly calcium carbonate, calcium phosphate and calcium sulfate, so that a system in which the process fluid is a predominantly aqueous stream having a deleterious proclivity to deposit such scale in fluid-conducting portions of the system, may be operated efficiently and economically.

It has further been discovered that particulate matter in industrial water may be kept in suspension in the aqueous stream by adding to it a small amount of the copolymer sufficient to maintain the matter in suspension, this amount generally being in the range from about 1 part per million (ppm) to about 200 ppm.

The copolymer has the configuration

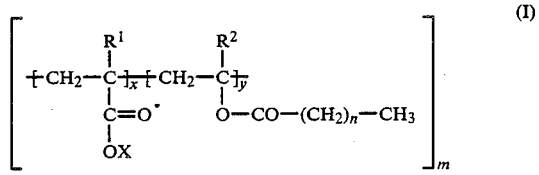

wherein,
$R^1$ represents H, or methyl;
$R^2$ represents H, methyl or ethyl;
X is selected from the group consisting of H, $NH_4$, an alkali metal, an alkaline earth metal, and zinc;
n is either 0 or 1;
m is an integer in the range from about 3 to about 70; and, for each y (that is, y=1) x is a number in the range from about 1 to about 19, and x and y are present in relative heterogeneous order.

It is therefore a general object of this invention to provide a process for dispersing and maintaining dispersed particulate matter in an aqueous medium containing such matter, and/or for controlling the deposition of scale imparting precipitates on surfaces of equipment used in recirculating or 'once-through' water systems containing such precipitates, or precipitate-forming ions, under conditions which form the precipitates, comprising adding to neutral or alkaline water a small amount in the range from about 1 ppm to about 200 ppm of a copolymer having the foregoing structure (I), so as to inhibit deposition of the precipitates, particularly those selected from the group consisting of calcium phosphate, calcium carbonate, calcium sulfate, barium sulfate, magnesium phosphate, magnesium hydroxide, calcium silicate, magnesium silicate, iron oxide, zinc hydroxide, zinc phosphate, calcium fluoride calcium oxalates and mixtures thereof.

It has also been discovered that a copolymer may be formed with the foregoing (M)AA and LAC components and also a third component, namely a LAS and SLAS which not only improves the solubility of the terpolymer formed, but also enhances its effectiveness as an inhibitor of scale deposition. The terpolymer has the configuration

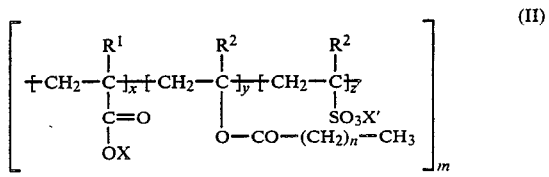

wherein,
$R^1$, $R^2$, X, x, y, n and m have the same connotation as that given hereinabove;
X' is selected from the group consisting of $NH_4$, an alkali metal, an alkaline earth metal, and zinc; and,
z' is a number in the range from 0.1 to about 1.0; and
x, y and z' are present in relative heterogeneous order.

It is therefore also a general object of this invention to provide a copolymer containing a lower alkenyl sulfonate or salt thereof, which copolymer may be tailored for desired effectiveness and solubility in a particular process stream for the conditions under which it is to be used.

It has still further been discovered that the foregoing copolymers of our invention, whether a terpolymer or bipolymer, may be hydrolyzed and the products of hydrolysis are almost as effective as the copolymer itself, that is, there is no substantial loss of activity for the purposes disclosed.

After complete hydrolysis of (I) the copolymer may be represented by the structure

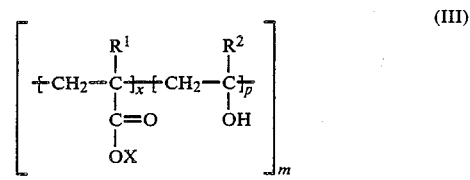

wherein, $R^1$, $R_2$, X, x and m have the same connotation as that given hereinabove, and p=y.

The copolymer may be partially hydrolyzed so that it contains a mixture of hydrolyzed and unhydrolyzed acetate or propionate moieties, the copolymer being represented by the structure

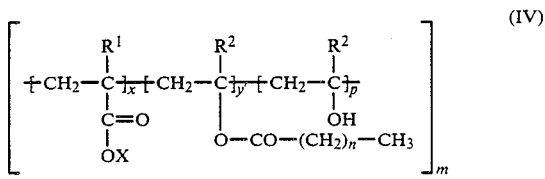

wherein,
$R^1$, $R^2$, X, x, y', n and m have the same connotation as that given hereinabove;
p is a number less than y (in I); and,
$y' = y - p$, so that when p=0, structure I results.

In an analogous manner, the terpolymer represented by the structure (II) may be either partially or completely hydrolyzed, being represented by the formula

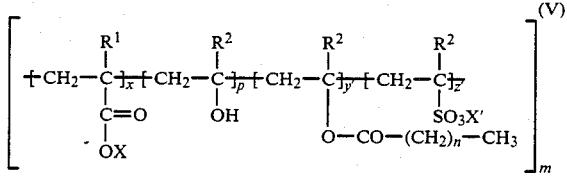
(V)

wherein,
$R^1$, $R^2$, X, X', x, y', p, z', n and m have the same connotation as that given hereinabove,
$y' = y - p$, and p is a number which is equal to, or less than y (in II).

DETAILED DESCRIPTION OF PREFERRED EMBODIMENTS

The effectiveness of the water treatment composition of our invention is predicated upon the presence of designated amounts of its constituent monomers. The copolymer is represented by the formula

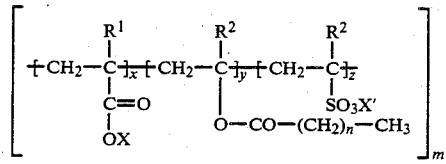
(VI)

wherein,
all symbols have the same connotation as hereinabove, and,
z is a number in the range from 0 to about 1.0; and x, y and z are present in relative heterogeneous order.

In an analogous manner, the terpolymer represented by the structure (II) may be either partially or completely hydrolyzed, being represented by the formula

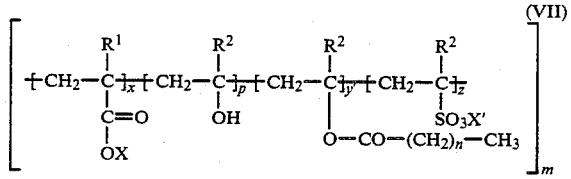
(VII)

wherein,
$R^1$, $R^2$, X, X', x, y', z, n, p and m have the same connotation as that given hereinabove,
p is a number which is equal to, or less than y; and,
$y' = y - p$ so that when p=0 and z≠0, structure II results.

It will be evident that when no SLAS is present (z=0), the copolymer may be a bipolymer of (M)AA and LAC, or a terpolymer which includes LAOH, or a copolymer which includes more than three monomeric moieties. By "lower alkenyl" we refer specifically to vinyl, 2-propenyl and isobutenyl; and, by "carboxylate" we refer specifically to acetates and propionates. When z is a number greater than 0 but less than 1, the copolymer is a terpolymer. When the copolymer containing LAC repeating units is hydrolyzed, the LAOH moiety is present. Typically, hydrolysis is effected under alkaline conditions with an alkali metal hydroxide so that X is alkali metal, usually sodium.

The LAC and SLAS may be prepared, if so desired, in any conventional manner, but they are commercially available, and are therefore purchased. The polymerization of the monomers results in a random copolymer the mol wt of which is adjusted by a little trial and error. The copolyer is preferably formed in high yield in the range from about 90% to about 99% by wt of copolymer. Because neither free monomeric or polymeric (M)AA, LAC or LAOH is sufficiently effective in inhibiting scale, it is desirable that the random copolymer be prepared so as to form a negligible amount of poly[(M)AA], or poly[(LAC)] or poly[(LAOH)]; or leave a negligible amount of monomeric (M)AA or LAC.

It is also a requirement that the copolymer be soluble in water. Though the copolymer is used in low concentrations in the range from about 1 to about 50 ppm in water to be treated, the solubility of the composition is at least 20 parts by wt per 100 parts by wt of water. Typically, the copolymer is used in water in the range from about 2 to about 20 ppm, though in some extreme cases as much as 200 ppm may be used. Thus, high solubility of water treatment compositions is not essential but desirable. The product is preferably shipped in drums as a concentrated aqueous solution containing in the range from about 20% to about 50% by wt of solids per 100 parts of solution. As the proportion of LAC in the copolymer increases, its solubility decreases. It is most preferred to have x in the range from about 1.5 to about 2.5, and z in the range from 0.25 to about 0.75 when y=1.0; and, x in the range from about 1.9 to about 10.75 when z=0 and y=1.

The preferred process embodied in this invention utilizes a copolymer derived from (M)AA and a lower alkenyl acetate ("LAC") and optionally the SLAS, which are polymerized under controlled conditions.

A particular terpolymer of (M)AA, VOAc and SVS (referred to herein as "the terpolymer"), is formed by the polymerization of the (M)AA, VOAc and SVS in a mutual solvent for them, preferably, for example, in a polar solvent whether aliphatic or aromatic, a lower alkanol having from 1 to about 6 carbon atoms, or in water, with an effective amount of a free radical initiator sufficient to produce the desired composition within an acceptable period of time.

Typically, from about 0.2 to about 5 parts by weight of initiator per 100 parts of (M)AA monomer are used, preferred initiators being acetyl benzoyl peroxide, peracetic acid, hydroxyheptyl peroxide, isopropyl peroxydicarbonate, methyl ethyl ketone peroxide, cyclohexane peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, caprylyl peroxide, methyl cyclohexyl hydroperoxide, t-butyl permaleic acid, t-butyl perbenzoate, di-ti-butyl diperphthalate, azobis-isobutyronitrile, the so-called redox and heavy metal polymerization initiators and the like, and others. The copolymer is usually formed in high conversion, usually in excess of 90% conversion and often as high as 95 to 100%.

The reaction is preferably carried out in a lower alkanol such as isopropanol diluted with a minor proportion by weight of water, at a temperature in the range from above about 30° C. to about 130° C. usually at atmospheric, or slightly elevated pressure less than about 50 psig. The concentration of the copolymer formed may range from about 25% to about 50% by wt, based on total solids.

The copolymer may also be formed in an acyclic ketone such as acetone, or in an acyclic ester such as ethyl acetate, or in xylene or toluene, but a mixture of isopropanol and water is preferred. Typically, the alcohol is stripped from the solution with steam, or distilled off with subsequent additions of water and repetition of distillation to remove the alcohol, followed by the addition of water and a neutralizing agent such as caustic solution, ammonia, a hydrazine or a low-boiling primary, secondary or tertiary aliphatic amine.

The final aqueous solution of polymer salt is preferably in the range from about pH 5 to about pH 8, and more preferably in the range of pH 6-7, with a total solids content of from about 2 to about 60 percent by weight and preferably from about 5 to about 50 percent by weight of polymer in water.

Though the biopolymer of (M)AA and VOAc, essentially free of vinyl alcohol moieties, is the most preferred composition for use in our process, the terpolymer with SLAS is comparably effective, though not over a very long period of time. The biopolymer is formed in a manner analogous to that described for the terpolymer, except of course, no SLAS is present.

The copolymers formed may have a weight average molecular weight in the range from about 1000 to about 25,000, and preferably from about 2000 to about 10,000 as determined by gel permeation chromatography. This determination is conventionally made according to ASTM method D-3536-76 (see ASTM Standards, Part 35, 1980), by dissolving the esterified copolymer (as in *J. Polym. Sci., Polym. Chem. Ec.*, 1976, Vol 14, pg 14) in tetrahydrofuran and comparing with a solution in THF of polystyrene of known molecular weight. The acid numbers of the copolymers formed, as determined by a conventional titration with KOH, may range from about 350 to about 700, corresponding to a weight fraction of from 30% to about 90% by wt of monomer units having COOH groups. The preferred polymers have more than 50% by wt of free carboxyl groups expressed as "% acrylic acid", and an acid number in the range from about 375 to about 700.

In a typical polymerization process, a glass lined or stainless steel jacketed reactor is charged with predetermined amounts of monomers along with the polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure.

EXAMPLE 1

Preparation of a copolymer of acrylic acid (AA) and vinyl acetate (VOAc)

A 10 gal (gallon) reactor was charged with 31.5 lb (pounds) isopropanol, and 6 lb of water, and brought to reflux under a $N_2$ atmosphere. While refluxing the solvent a mixture of 20 lb AA and 5 lb VOAc, and separately, 0.75 lb Lupersol 11, are concurrently metered into the reactor, slowly. The reaction is allowed to proceed for about an hour after all the catalyst is metered, and then the isopropanol is stripped from the reaction mixture. Water is added to yield about 40% solids in the product.

In an analogous manner, copolymers are formed by substituting 2-propenyl acetate for vinyl acetate. Similarly, methacrylic acid may be used instead of, or in addition to acrylic acid; and 2-propenyl acetate may be used instead of or in addition to, vinyl acetate. As one skilled in the art will readily appreciate, the molecular weights of the copolymers formed will vary in accordance with the proportions of monomers charged to the reaction flask, and also with the precise conditions of polymerization.

With respect to the polymerization, it will be appreciated that it is essential to maintain the temperature of the reaction mass during polymerization in a suitable temperature range, preferably from about 50° C. to about 130° C., and to do this, suitable means are provided to maintain the desired temperature in the polymerization reactor. This is most conveniently done by allowing the reaction mass to heat to reflux autogenously, or heating it if necessary, under substantially atmospheric pressure, though elevated pressure in the range from 1 to about 5 atm. may be used if desired, then cooling the reactor with appropriate heat exchange means, preferably with a reflux condenser. Additionally, a cooling jacket and internal heat exchange coils may be provided in the reactor. Testing for inhibition of scale due to calcium phosphate:

The copolymers formed in each of the foregoing examples, and several others, are used to treat water which contains calcium ions and phosphate ions in a stirred pH-STAT test (maintaining constant pH using an automatic titrator) to gauge the effectiveness of the polymer for inhibiting the formation and deposition of calcium phosphate.

A known volume of phosphate salt such as $Na_2HPO_4$ or other soluble phosphate salt solution was transferred to a known volume of distilled water in a double-walled glass cell, to give a final concentration of 9–10 ppm of orthophosphate ions. To this solution was added slowly and with continuous stirring a known volume of testing polymer solution sufficient to give a dosage of 10 ppm. A pair of glass and reference electrodes, which was calibrated before and after each experiment with standard buffer solutions (pH 7.00 and 9.00), was then immersed in the solution which was maintained at 50° C. by circulating water through the outside of a glass cell jacket. After about 45 min a known volume of calcium chloride solution was slowly added to the continuously stirred (350 rpm) solution containing phosphate and polymer, to give a final calcium ion concentration of 140 ppm. The pH of the solution was then immediately brought to pH 8.50 by automatic addition of 0.10M NaOH solution. The pH of the solution was then maintained to 8.50±0.01 throughout the experiments using the pH-stat technique (see *Caries Res* 13, 250–258, 1979). Solution samples were withdrawn after 1 hr, and 22 hr, and analyzed, after filtration through 0.22 micrometer filter paper, for orthophosphate ions using the ascorbic acid method as described in detail in "Standard Methods for the Examination of Water and Waste Water" 14th edition, prepared and published jointly by American Health Association et al. The instrument used for the colorimetric measurements was a Beckman 5270 Spectrophotometer.

Tests for calcium sulfate and calcium carbonate were carried out by the method of Ralston (see *J. Pet. Tech.*, August 1969, 1029–1036).

Testing for inhibtion of scale due to magnesium hydroxide:

A supersaturated solution of $Mg(OH)_2$ in water is prepared which contains about the following concentrations: $Mg^{++}=19$ mg/l, $OH^-=27$ mg/l, and NaCl=3.8%. To a 100 ml quantity of the supersaturated solution is added 5 ppm of polymer and the solution stored in polyethylene bottles in an air convection oven at 66° C. for 24 hr. The solution is then filtered through 0.22 micron Millipore filter paper and the filtrate analyzed for Mg.

Threshold inhibition data for the polymers of this invention and for several standards will respect to the above mineral scales are summarized in Table I herebelow.

EXAMPLE 2

Preparation of a copolymer of acrylic acid (AA), vinyl acetate (VOAc), and sodium vinyl sulfonate (SVS)

In a manner analogous to that described in example 1 hereinabove, 27.5 lb of AA, 15 lb of VOAc and 7.5 lb of SVS were charged to the reactor with sufficient catalyst to yield a desirable polymer, and the polymerization carried out as set forth hereinabove. The product obtained contained about 40% by wt solids. In an analogous manner, sodium isopropenyl sulfonate is used to form a terpolymer with MAA and VOAc. As before, the mol wts may be varied in accordance with the proportions of the monomers charged, but most preferred are terpolymers having a mol wt in the range from about 5000 to about 8000 and which contain about 60 parts by weight, or more, of (M)AA per 100 parts of terpolymer.

Testing for effectiveness as a dispersing agent ("dispersant activity"):

Dispersant activity is measured as a function of time for a particular concentration of polymeric dispersant which is to be tested as a dilute solution in water. In this test 5.0 g of natural kaolin powder from Holmes County Ohio, which powder is smaller than 60 mesh, U.S. Standard Sieve Series, is added to a 100 ml graduated cylinder containing 100 ml of the polymer solution at the test concentration (2 ppm). The pH of the slurry is adjusted to 6.2–6.9 with dilute NaOH or HCl if required and the slurry is then slowly shaken by hand for about 60 sec. The graduates are allowed to stand and the volume of dispersed solids is recorded as a function of time, reading the numbered graduations directly. The higher the volume of dispersed solids (the larger the number), the more efficient is the dispersing agent.

In addition to the concentration of the particular dispersant in the suspension, the pH, the size and the size distribution of the particles, there are several other factors which influence the dispersant activity, among which factors are the type of solid particles held in the suspension, their surface area, the presence of additional solutes, the temperature, the degree of agitation initially provided, inter alia.

Accordingly, this test is repeated each time the dispersant activity of various polymers is to be compared at a preselected concentration (2 ppm) at room temperature (72° F.) at a pH in the range 6.2–6.9, thus keeping all variables except the dispersant, substantially invariant.

After initially shaking the suspension by hand for from 30–60 sec in a 100 ml graduated cylinder, it is allowed to stand and a beam of light is directed from above the cylinder so as to pass longitudinally axially through the suspension. Where the beam's path appears to be effectively blocked, an interface is deemed to exist which separates relatively clear suspension from relatively opaque suspension. The greater the depth of the relatively clear supernatant, the further the beam travels. The larger the volume of opaque suspension, the more effective is the dispersant activity.

In addition to the relatively clear volume, and the relatively opaque volume, there is a "settled volume" of solid particles which forms a packed bed in the bottom of the graduate (hence the term "settled volume"). This settled volume, of course, will be opaque to the light beam but is not taken into consideration for the purposes of determining the relatively opaque volume referred to hereinabove. The settled volume is determined by making a reading of the bed volume with the naked eye.

In the following Table II, a suspension with no polymer ("blank") has a settled volume of 9.5 ml after 22 hr. With *Good-rite ® K-732 poly(AA) one gets a settled volume of 8 ml after 22 hr, the other dispersants having the values given. A good dispersant deflocculates or deagglomerates the particles in suspension thus dispersing small particles which, when they finally settle, will pack more densely than larger particles, thus will give a smaller settled volume.

*Trademark of The B. F. Goodrich Company

The results are set forth in Table II as two numbers separated by a 'slash', thus, 91/4.5, the first number indicating the reading on the graduate at the interface between the relatively clear supernatant and the opaque dispersed clay suspension, the second number indicating the reading for the settled volume.

A study of the results tabulated herebelow indicates that K-732 poly[(AA)] having a mol wt of about 5100 has the smallest settled volume after 170 min, and that the compositions used in this invention are comparable to commercial poly[(AA)] such as Good-rite K-732 and Good-rite K-752.

TABLE I

| Ex. No. | Polymer | Mol ratio monomers | Wt. ratio monomers | Mol. Wt. (approx) | % inhibition [1]Ca$_3$(PO$_4$)$_2$ after 1 hr | [1]Ca$_3$(PO$_4$)$_2$ after 22 hr | [2]CaCO$_3$ | [3]CaSO$_4$ | [4]Mg(OH)$_2$ |
|---|---|---|---|---|---|---|---|---|---|
| 1 | poly[(AA)(VOAc)]* | 10.75:1 | 90:10 | 5000 | 43 | 25 | 84 | 98 | 33 |
| 2 | " | 4.78:1 | 80:20 | 5000 | 92 | 86 | 74 | 97 | 34 |
| 3 | " | 2.79:1 | 70:30 | 5000 | 87 | 85 | 56 | 98 | 32 |
| 4 | " | 1.79:1 | 60:40 | 5000 | 43 | 22 | 50 | 99 | 29 |
| 5 | " | 4.78:1 | 80:20 | 2200 | 59 | 26 | 41 | 98 | |
| 6 | " | 4.78:1 | 80:20 | 9800 | 86 | 70 | 75 | 52 | |
| 7 | poly[(AA)] | | | 2100 | 27 | 16 | 79 | 99 | |
| 8 | " | | | 5100 | 20 | 12 | 68 | 66 | |
| 9 | poly[(VOAc)] | | | 5000 | 0 | 0 | | | |
| 10 | poly[(AA)(VOAc)(SVS)] | 2.19:1:0.33 | 55:30:15 | 5000 | 83 | 85 | 43 | 54 | |
| 11 | poly[(MAA)(VOAc)] | 4:1 | 80:20 | 5000 | 16 | 12 | 51 | 7 | |
| 12 | poly[(AA)(VOAC)]** | 4.78:1 | 80:20 | 4500 | 28 | 14 | 76 | 99 | 31 |
| 13 | " | 2.79:1 | 70:30 | 4250 | 78 | 20 | 62 | 99 | 25 |

TABLE I-continued

| Ex. No. | Polymer | Mol ratio monomers | Wt. ratio monomers | Mol. Wt. (approx) | % inhibition $^1Ca_3(PO_4)_2$ after 1 hr | $^1Ca_3(PO_4)_2$ after 22 hr | $^2CaCO_3$ | $^3CaSO_4$ | $^4Mg(OH)_2$ |
|---|---|---|---|---|---|---|---|---|---|
| 14 | ***Natrol-42 | 3:1 | 63:37 | | 48 | 36 | 50 | 49 | |

$^1$Conditions: $[Ca^{++}]$ = 140 ppm; $[PO_4^{-3}]$ = 9.2 ppm; pH = 8.50 ± 0.01; T = 50° C.; time = 1 hr and 22 hr; 10 ppm polymer.
$^2$Conditions: $[Ca^{++}]$ = 110 ppm; $[HCO_3^{-1}]$ = 760 ppm as $HCO_3^-$; $[CO_3^{-2}]$ = 18 ppm as $CO_3^=$; T = 66° C.; time = 24 hr; 3 ppm polymer.
$^3$Conditions: $[Ca^{++}]$ = 2000 ppm; $[SO_4^{-2}]$ = 4800 ppm; T = 66° C.; time = 24 hr; 2 ppm polymer.
$^4$Conditions: $[Mg^{++}]$ = 19 ppm; $[OH^{3l}]$ = 27 ppm; NaCl = 3.8%; T = 66° C.; time = 24 hr; 5 ppm polymer.
*unhydrolyzed polymer
**essentially completely hydrolyzed copolymer
***more fully described in U.S. Pat. No. 4,029,577.

TABLE II

| Ex. No. | Polymer | Weight ratio of monomers | Mol. Wt. (approx.) | Time 11 min | 21 min | 90 min | 170 min | 22 hr |
|---|---|---|---|---|---|---|---|---|
| 15 | poly[(AA)(VOAc)]* | 80:20 | 5000 | 91/4.5 | 91/6 | 82/9 | 74/9 | 38/9 |
| 16 | poly[(AA)(VOAc)]** | 80:20 | 4500 | 70/30 | 60/13 | 0/10 | — | 0/9.5 |
| 17 | poly[(AA)(VOAc)(SVS)]* | 55:30:15 | 5000 | 92/5.5 | 90/6 | 84/7 | 79/8 | 38/9.5 |
| 18 | poly[(AA)] K-732$^1$ | — | 5100 | 93/8 | 87/7.5 | 81/7 | 79/7 | 56/8 |
| 19 | poly[(AA)] K-752$^1$ | — | 2100 | 0/35 | 0/12 | 0/- | — | 0/8.5$^+$ |
| 20 | poly[(AA)] K-722$^1$ | — | 170,000 | 0/14 | 0/12 | 0/10.5 | 0/10.5 | 0/10.5 |
| 21 | poly[(AA)] LMW-45X$^2$ | — | 9000 | 0/15 | 0/13 | 0/11 | — | 0/10.5 |
| 22 | blank | — | — | 35/- | 0/15 | 0/11 | 0/10 | 0/9.5 |

$^1$from The B. F. Goodrich Company
$^2$from Rohm & Haas Co.
$^+$after 15.5 hr.
*unhydrolyzed copolymer
**essentially completely hydrolyzed copolymer The foregoing examples are directed to threshold inhibition in typical cooling water process streams. However, other process water streams which contain concentrations of ions far in excess of typical cooling water streams may also be effectively treated for scale inhibition with the copolymers of our invention in concentrations from about 5 ppm to about 200 ppm, and in some instances as high as 500 ppm where the cost is justified. Such other process water streams include brine solutions such as are processed in desalination plants, particularly in the multiple evaporators thereof; and in brackish waters containing a high concentration of salts such as are typically encountered in membrane devices for reverse osmosis processes. Still other process water uses are in various oil field applications for scale inhibition in conduits circulating saline and oily water, where the water is present in a major amount by weight, most particularly in secondary oil recovery operations.

It has also been found that copolymers of our invention appear to be non-toxic to humans when used in animal's milk and in fruit juices in a small amount in the range from about 0.05 to about 10 ppm, more preferably from about 0.1 to about 1 ppm. Thus milk containing copolymer in an amount sufficient for inhibiting the deposition of scale on the surfaces of pasteurizing equipment is found highly suitable for minimizing maintenance and shutdowns in milk processing plates. In an analogous manner, our copolymers may be used to inhibit the deposition of scale inside equipment used to process the sucrose and other sugar-containing juice extracted from various fruits, particulary the juice extracted by crushing and pressing sugar cane and sugar beets.

It will further be noted that the examples illustrate the use of unhydrolyzed copolymer and of essentially fully hydrolyzed copolymer. However, the degree to which hydrolysis is effected may be controlled if a particular degree of hydrolysis is desired. Typically the value of p may be controlled within the range from about 0.01 to about 0.5 when y is in the range from 0.5 to 0.9. In an analogous manner, when z is greater than zero and is represented by z' in the range from 0.1 to about 1.0, the degree of hydrolysis, and thus the value of p may also be controlled in the range from 0.01 to about 0.5 for each y. When z' is in the range specified, the numerical value of x will still range from about 2.5 to about 15.0 times the amount of y present.

We claim:

1. A method of inhibiting the deposition of scale due particularly to calcium phosphate, zinc phosphate and magnesium phosphate formed in a system for treating process water, comprising, adding to said process water from 1 part per million (pp) to about 200 ppm of a water-soluble essentially non-crosslinked random copolymer, optionally after said copolymer is subjected to hydrolytic conditions, said copolymer having the structural formula $$\left[ \left( CH_2-\underset{\underset{OX}{\overset{\overset{R^1}{|}}{C=O}}}{C} \right)_{\overline{x}} \left( CH_2-\underset{O-CO-(CH_2)_n-CH_3}{\overset{R^2}{C}} \right)_{\overline{y}} \quad \left( CH_2-\underset{SO_3X'}{\overset{R^2}{C}} \right)_{\overline{z}} \right]_m$$

wherein, $R^1$ represents H, or methyl;
$R^2$ represents H, methyl or ethyl;
X is selected from the group consisting of H, $NH_4$, an alkali metal, an alkaline earth metal and zinc;
n is either 0 or 1;
X' is selected from $NH_4$, an alkali metal, an alkaline earth metal and zinc;
z is a number in the range from 0 to about 1.0;
m is an integer in the range from about 3 to about 70;
x is a number in the range from about 2.5 to about 15.0 times the amount of y present; the mole ratio of reactants used to form the copolymer contains at least 50 mole percent of acrylic or methacrylic acid relative to the remaining constitutents of the copolymer; and, x, y and z are present in relative heterogeneous order.

2. The method of claim 1 wherein said process water is used in a steam generating system.

3. The method of claim 1 wherein said process water is used in a recirculating cooling water system.

4. The method of claim 1 wherein said process water is used in a gas scrubbing system.

5. The method of claim 1 wherein said process water stream is a brine circulated in a process for desalinating water.

6. The method of claim 1 wherein said process water stream is circulated in a process for recovering crude petroleum including hydrocarbon gases.

7. The method of claim 1 wherein X represents $NH_4$, Na or K; $R^1$ and $R^2$ each represents H; and z=0.

8. The method of claim 7 wherein said copolymer is subjected to hydrolytic conditions prior to, or during use in said process water, so as to form a copolymer having the formula

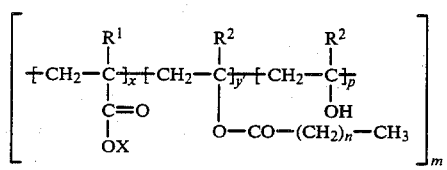

wherein, $R^1$ and $R^2$ each represent H;

X represents Na;

x, y, m and n have the same connotation as that given; p is a number less than y; and, $y' = y - p$.

9. The method of claim 8 wherein said water contains from about 2 ppm to about 20 ppm of said copolymer, n=0; p is in the range from 0.01 to about 0.5 when y is in the range from 0.5 to 0.99.

10. The method of claim 1 wherein z is greater than 0 and is represented by $z'$ in the range from 0.1 to 1.0 in a copolymer having the structural formula

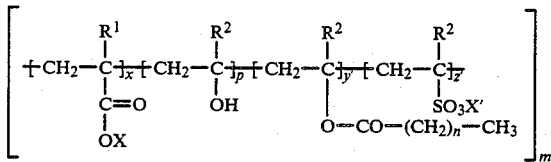

wherein, $y' = y - p$, and $z'$ is specified for each y.

11. The method of claim 10 wherein said process water is used in a steam generating system.

12. The method of claim 10 wherein said process water is used in a recirculating cooling water system.

13. The method of claim 10 wherein said process water is used in a gas scrubbing system.

14. The method of claim 10 wherein X represents $NH_4$, Na or K; $R^1$ and $R^2$ each represents H.

15. A method for inhibiting the deposition of scale due particularly to calcium phosphate formed in a system for pasteurizing milk, comprising, adding to said milk from 0.05 part per million (ppm) to about 10 ppm of a water-soluble essentially non-crosslinked random copolymer, optionally after said copolymer is subjected to hydrolytic conditions, said copolymer having the structural formula

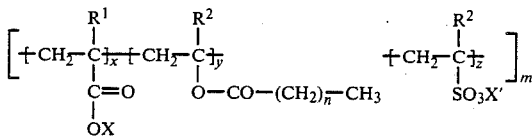

wherein, $R^1$ represents H, or methyl;

$R^2$ represents H, methyl or ethyl;

X is selected from the group consisting of H, $NH_4$, an alkali metal, an alkali earth metal and zinc;

n is either 0 or 1;

X' is selected from $NH_4$, an alkali metal, an alkaline earth metal and zinc;

z is a number in the range from 0 to about 1.0;

m is an integer in the range from about 3 to about 70;

x is a number in the range from about 2.5 to about 15.0 times the amount of y present; the mole ratio of reactants used to form the copolymer contains at least 50 mole percent of acrylic or methacrylic acid relative to the remaining constitutents of the copolymer; and, x, y and z are present in relative heterogeneous order.

16. The method of claim 15 wherein z is greater than 0 and is represented by $z'$ in the range from 0.1 to 1.0 in a copolymer having the structural formula

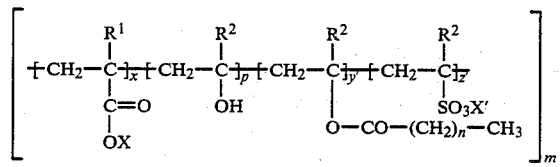

wherein, $y' = y - p$, and $z'$ is specified for each y.

17. A method for inhibiting the deposition of scale due particularly to calcium carbonate, calcium phosphate, calcium oxalate and magnesium silicate formed in a system for processing fruit juice, comprising, adding to said juice from 0.05 part per million (ppm) to about 10 ppm of a water-soluble essentially non-crosslinked random copolymer, optionally after said copolymer is subjected to hydrolytic conditions, said copolymer having the structural formula

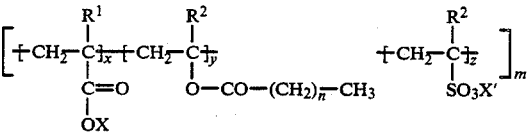

wherein, $R^1$ represents H, or methyl;

$R^2$ represents H, methyl or ethyl;

X is selected from the group consisting of H, $NH_4$, an alkali metal, an alkaline earth metal and zinc;

n is either 0 or 1;

X' is selected from $NH_4$, an alkali metal, an alkaline earth metal and zinc;

z is a number in the range from 0 to about 1.0;

m is an integer in the range from about 3 to about 70;

x is a number in the range from about 2.5 to about 15.0 times the amount of y present; the mole ratio of reactants used to form the copolymer contains at least 50 mole percent of acrylic or methacrylic acid relative to the remaining constituents of the copolymer, and, x, y and z are present in relative heterogeneous order.

18. The method of claim 17 wherein z is greater than 0 and is represented by z′ in the range from 0.1 to 1.0 in a copolymer having the structural formula

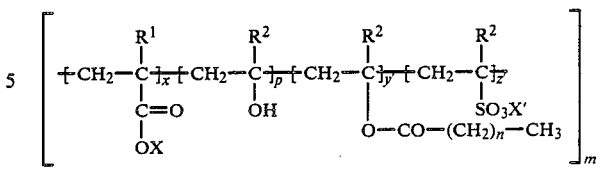

wherein, $y' = y - p$, and $z'$ is specified for each y.